April 1, 1924.
W. A. RIDDELL
PHOTOGRAPHIC SHUTTER
Filed Nov. 8, 1921
1,488,896
4 Sheets-Sheet 1
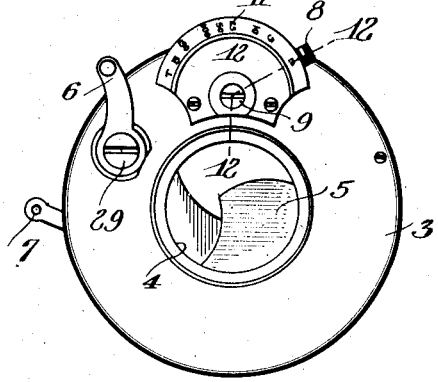
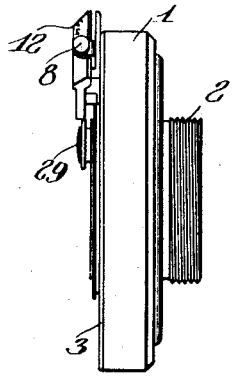
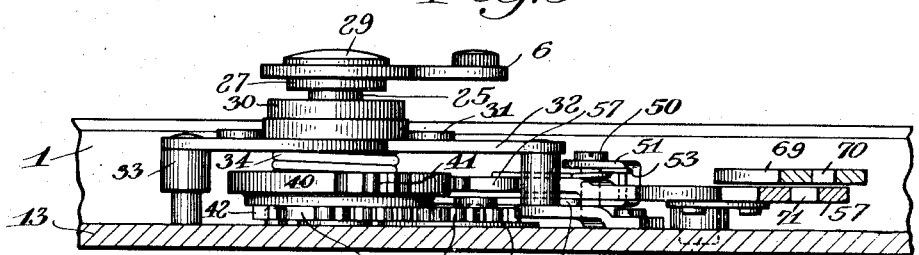
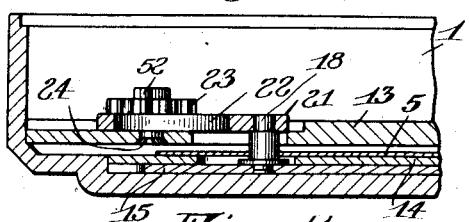
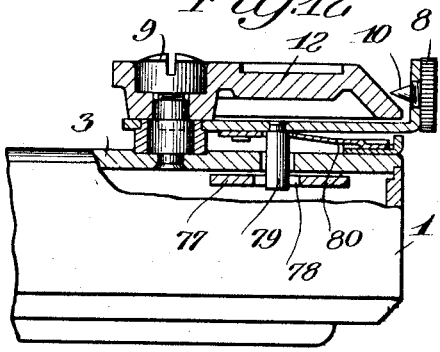
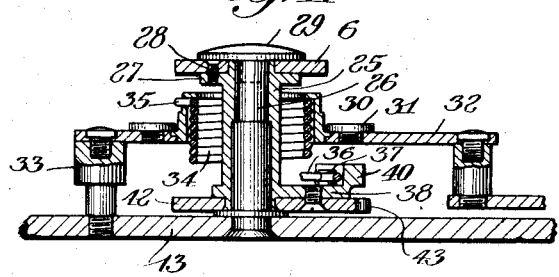
INVENTOR
William A. Riddell
BY
his ATTORNEY April 1, 1924.

W. A. RIDDELL 1,488,896

PHOTOGRAPHIC SHUTTER

Filed Nov. 8, 1921

INVENTOR.
William A. Riddell
BY
his ATTORNEY.

April 1, 1924.

W. A. RIDDELL 1,488,896

PHOTOGRAPHIC SHUTTER

Filed Nov. 8, 1921

INVENTOR
William A. Riddell,
BY
his ATTORNEY

April 1, 1924.

W. A. RIDDELL 1,488,896

PHOTOGRAPHIC SHUTTER

Filed Nov. 8, 1921

INVENTOR.
William A. Riddell
BY
his ATTORNEY

Patented Apr. 1, 1924.

1,488,896

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed November 8, 1921. Serial No. 513,791.

*To all whom it may concern:*

Be it known that I, WILLIAM A. RIDDELL, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photography, and more particularly to photographic shutters. It is particularly applicable to the modern type of pivoted blade symmetrical opening shutter in which a resistance such as a gear train is employed as a retarding device to automatically time the duration of the exposure. The improvements are directed in part toward providing improved means for transmitting the motion of the master member or prime mover to the blade mechanism and to the retarding device in such manner that these parts will be locked between operations of the shutter and prevent the mechanism from becoming disordered when once regulated for a predetermined length of exposure. The improvements are further directed toward the provision of certain conveniences in adjustment and toward rendering the retarding mechanism less effective when the master member is being rewound than it is when that mechanism is operating positively. To these and other ends the invention consists in certain improvements and combinations of parts, all as will be hereinafter more fully described, the novel features being pointed out in the claims at the end of the specification.

In the drawings:

Figure 1 is a front view of a photographic shutter constructed in accordance with and illustrating one embodiment of my invention;

Figure 2 is a side view thereof;

Figure 9 is an enlarged fragmentary side view of the master member and adjacent mechanism;

Figure 10 is a section through the blade driving mechanism taken on the line 10—10 of Figure 3;

Figure 11 is a fragmentary axial section through the master member as shown in Figure 9, taken on the line 11—11 of Fig. 4, and Figure 12 is an enlarged section through the regulating mechanism taken on the line 12—12 of Figure 1.

Similar reference numerals throughout the several views indicate the same parts.

Figure 3:
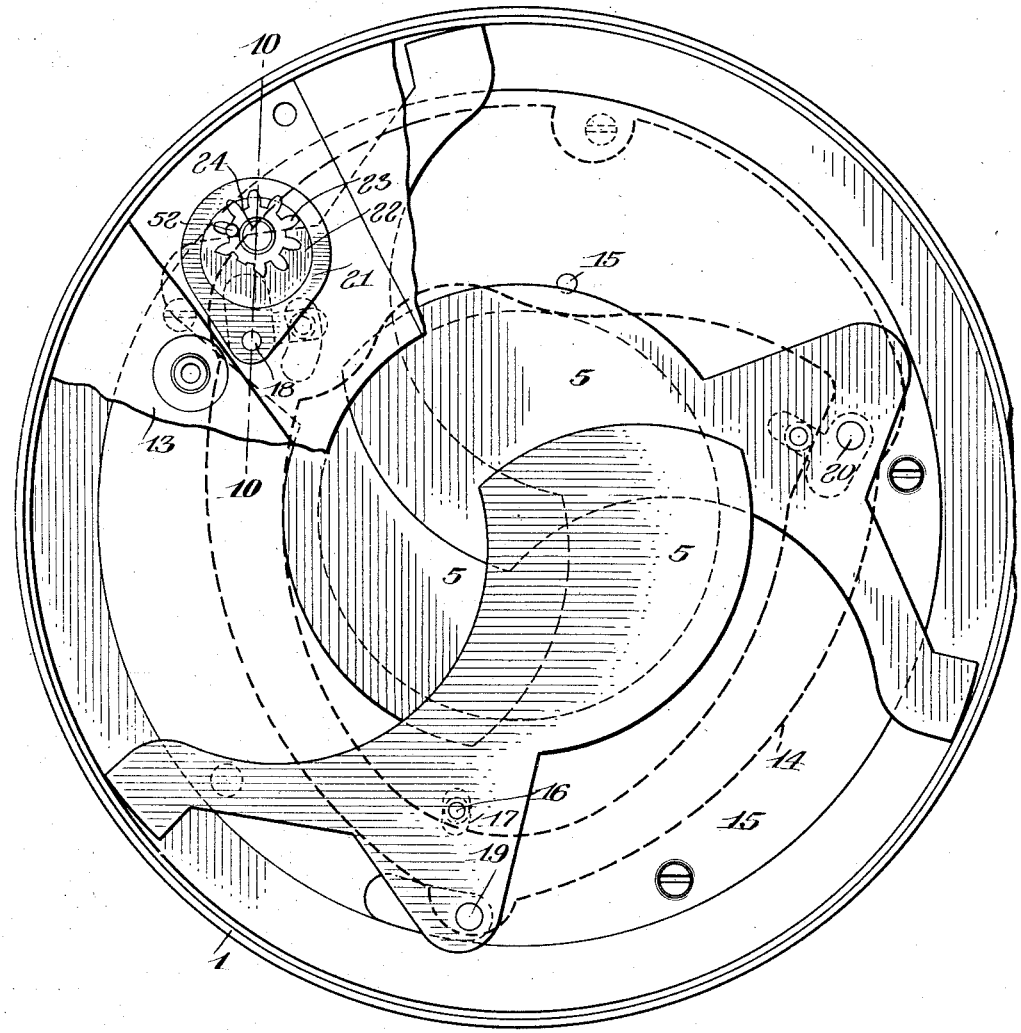
Figure 3 is an enlarged interior front view of the blade mechanism with parts removed or broken away.

The shutter in connection with which I have illustrated my present improvement is of the usual type embodying an annular casing 1 for attachment to the lens tube of the camera by means of a threaded collar 2 at the back and sealed at the front by an annular cover plate 3, the exposure opening being indicated at 4 and the blades for closing the same at 5. The shutter is, in the present instance, of the set type and, referring to Figure 1, the setting lever that winds or energizes the master member is shown at 6 being moved to the left for this purpose in that figure. The tripping or operating lever is indicated at 7 while 8 indicates the regulator by means of which the character or duration of the exposure is predetermined and controlled. It swings on the center 9 and carries an indicator 10 co-operating with the characters 11 on a segmental scale plate 12, which characters are in terms of the different exposures.

The particular blade mechanism employed forms no part of the present invention and hence need not be described in detail particularly as the same construction is shown in the prior patent to Pirwitz, No. 1,307,751 of June 24, 1919. So far as the present invention is concerned it is sufficient to understand (Figures 3 and 10) that the blades are located as usual in a depression at the rear of the casing beneath a partition member 13 that carries most of the mechanism hereinafter described. Also located in this depression is a vibratory yoke 14 pivoted at 15 and shown in heavy dotted lines in Figure 3 beneath a fixed ring 15. The blades each carry a fixed pivot 16 having an elongated bearing 17 in the ring 15 and they are engaged at another point by swinging pivots 18, 19 and 20 on the yoke 14 so that as the yoke is vibrated the blades open and close. One of the pivots 18 is utilized also to impart motion to the yoke itself to which end it has a bearing in an eccentric strap 21 turning on and driven by an eccentric 22. This eccentric is fixed to a gear 23 to turn with it on a stud 24 fixed to the partition member 13 which gear cooperates with and is driven by the master member hereinafter described.

Figure 4:
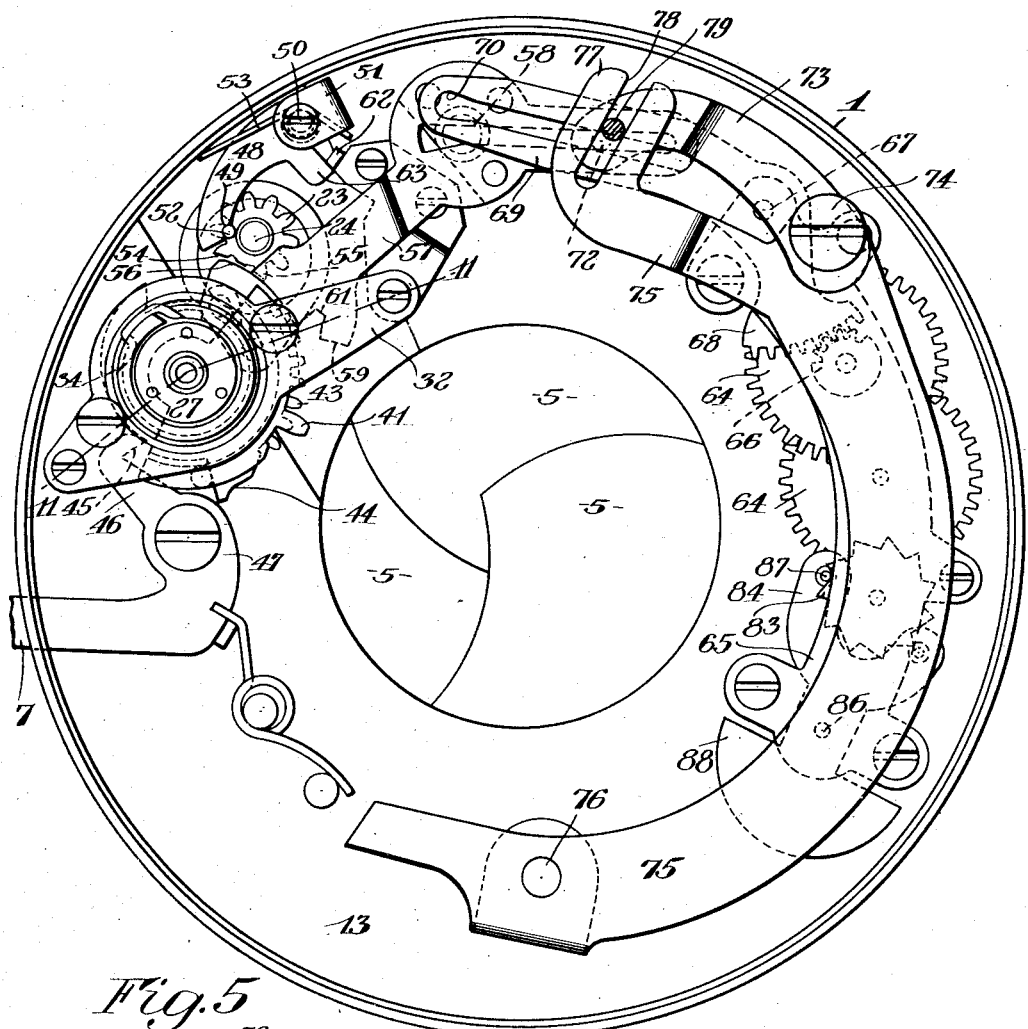
Figure 4 is an enlarged interior front view of the driving mechanism with certain overlying parts removed showing the master member and connected mechanism in normal or run-down position.
Figure 5:
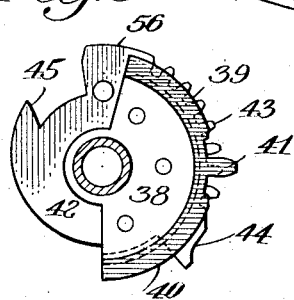
Figure 5 is a detail of the master member as it appears in Figure 4.

Referring more particularly to Figures 4, 9 and 11, the master member embodies a hub 25 turning on a stud 26 fixed to the partition plate 13. To a collar 27 on the upper end of the hub is secured by small screws 28 the setting lever 6 previously described beneath a cap screw 29 threaded into the top of the stud. The stud and hub pass up through a cylindrical spring housing 30 detachably supported by screws 31 on a stage or bridge 32 fixedly mounted by means of posts 33 on the partition plate 13. A spring 34 coiled within the housing and about the hub has one end 35 connected to the former and the other end 36 engaged with a pin 37 on a segment plate 38 forming an extension at the lower end of the hub. This segment plate is provided with two concentric cylindrical surfaces 39 and 40 (Figure 5) and with an intermediate gear tooth 41. Below it and secured to it is a disk 42 having a gear segment 43 formed therein together with an adjacent cam 44 at one end thereof to be later referred to. The disk is also provided with a recess forming a latch shoulder 45 that is engaged by a latch hook 46 on the inner end of the operating or tripping lever 7 heretofore referred to which is pivoted at 47 within the casing. This latch engages the shoulder and holds the master member wound with the spring 34 under tension when the winding lever 6 and its hub 25 are wound to the left in the figures, the latch being shown so engaged in Figure 6.

The disk 42 on the hub of the master member has to do with the driving of the blade mechanism while the segment plate 38 above it operates the retarding mechanism, it being obvious that these two mechanisms must be operated at the same time from the same source in order to impose the retarding effect upon the blades themselves while in open position.

Figure 6:
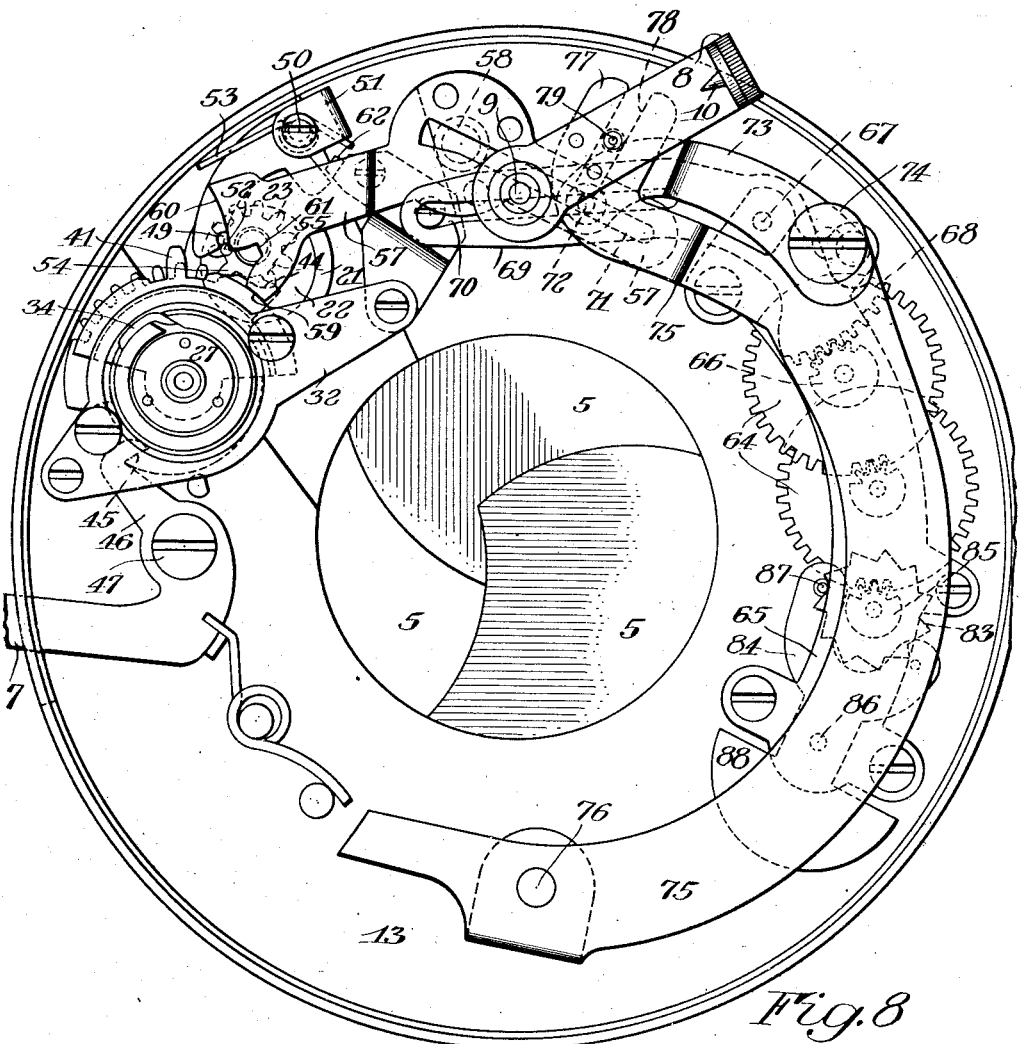
Figure 6 is a view similar to Figure 4 showing the parts in wound or set position.

The blades are normally locked in their normal or closed position by the engagement of a yielding latch 48, notched at 49 to provide locking shoulders, and pivoted at 50 to a fixed bracket 51 on the casing with a pin 52 on the gear 23, as shown in Figure 4, the latch being operated into engagement by a spring 53 coiled about its pivot. The gear 23 is an interrupted gear and in this position bound by the mutilated teeth 54 and 55 is opposed to a blind or cylindrical surface 56 on the disk 42. When the master member is wound the segment teeth 43 of the disk 42 have clearance in the mutilated or interrupted portion of the gear 23 until they have passed the set position whereupon the cam 44 at the end of the segment engages the tooth 55 of such gear 23 and kicks the latch 48 out of engagement by rotating the gear in a counter-clockwise direction sufficiently to throw the other mutilated tooth 54 or the addendum thereof into the pitch line of the segment 43, all as shown in Figure 6. Therefore, when the master member is released by tripping the lever 7 the segment 43 comes in mesh with the gear 23 and drives it through one revolution in the first half of which the blades are opened and in the latter half of which they are closed. After closing the latch 48 automatically reengages the pin 52.

During this time the retarding mechanism is also being actuated which retarding mechanism embodies a vibratory lever 57 pivoted at 58 to the partition wall 13. One arm thereof projects in juxtaposition to the master member and terminates in two reentrant arcuate end faces 59 and 60 on opposite sides of an intermediate notch 61 forming gear surfaces with which is adapted to mesh the tooth 41 on the sector plate 38 of the master member. When the master member is swung in either its setting or its operative movement, the tooth 41 engages the retarding lever 57 and swings it from one to the other of the positions shown in Figures 4 and 6. As the lever 57 is connected up to the resistance hereinafter described and the effect of retarding action upon the master member is directly proportional to the degree of movement of the lever, it is important that the master member pick up lever 57 at exactly the same point each time the master member operates. It is further important that the retarding lever 57 be movable only by the master member and not when the latter is at rest in either of its positions to permit accurate regulation of the retarding mechanism in the manner hereinafter described.

Therefore, I have provided an arrangement whereby the locking face 59 on the retarding lever 57 rides on to the concentric or blind cylindrical face 40 of the segment plate 38 of the master member when the latter is wound or set as in Figure 6, and the other locking face 60 similarly engages the blind face 39 when the master member is in normal or run-down condition. Both of these re-entrantly curved faces 59 and 60 fit the master member so closely that it is impossible to move the lever 57 except at the instance of the master member and when the tooth 41 thereof is engaged with the notch 61. It is convenient for other reasons to make the face 59 shorter than the face 60 but the upward or setting movement of the retarding lever 57 is limited by a fixed stop 62 on the casing which also is engaged by a tail 63 on the blade locking latch 48 to limit its movement.

The yielding resistance of the retarding mechanism is offered principally by a gear train 64 having suitable bearings in a bridge piece 65 and supported on the partition plate 13. Meshing with a pinion 66 on the first gear is a lever pivoted at 67 and embodying a tooth segment 68 while the other arm of the lever indicated at 69 is slotted at 70 and crosses the similar arm of the lever 57 which is slotted at 71. A shiftable fulcrum pin 72 passes transversely through both slots and by changing the position of this fulcrum pin the mechanical advantage of one lever upon the other is altered and in this way the inertia of the gear train offers greater or less resistance as desired to the master member when the gear train is driven through the medium of the lever 57. This movement is old in shutters of this general type, but I have improved features relating to the adjustment and regulation of the fulcrum pin 72. The fulcrum pin is carried in the present instance upon the end of a link 73 pivoted at 74 to a semi-annular regulating element 75 pivoted at 76 to the partition member 13. The upper end of this regulator is forked at 77 to provide a slot 78 that receives a downwardly projecting pin 79 (Figure 12) on the regulating lever 8. Therefore when this hand lever 8 is swung back and forth on its scale 12 the regulating element 75 will be swung correspondingly and through the link 73 will give the desired adjustment of the fulcrum pin 72 between the levers 57 and 69 to vary the retarding action. As shown in Figure 12, the dial or scale 12 is fixed on the stud 9 on which the lever 8 turns and helps to hold the latter in place while the leaf spring 80 on the bottom of the lever 8 suitably cooperates with the shutter casing to center and lock the lever 8 in adjusted position, but these details form no part of the present invention.

Figure 8:
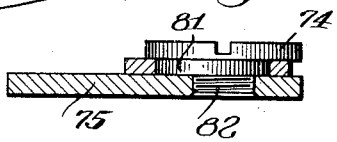
Figure 8 is an enlarged section on the line 8—8 of Figure 7.
Figure 7:
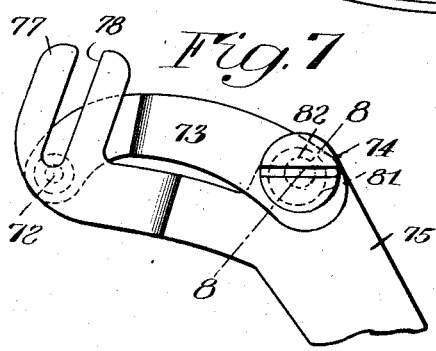
Figure 7 is a fragmentary detail view of a portion of the regulator as it appears in Figure 6.

Of course, the accurate timing of the shutter and the accuracy of the scale 12 in indicating its adjustment depend upon a very sensitive adjustment of the shiftable fulcrum pin 72 both in assembling and in regulating the retarding device. In order to aid the workman in the first mentioned instance, I provide for altering the zero position of the fulcrum pin by arranging for an adjustment of the link 73 on the regulator 75. To this end (Figures 7 and 8) I divide the headed pivot stud 74 upon which the link 73 turns into a bearing portion 81 for the link and an attaching portion 82 by means of which it is threaded into the regulator 75. These two portions 81 and 82 are eccentric with respect to each other so that as the stud 74 is turned it gives a longitudinal movement to the link 73 relatively to the regulator 75. When, by this means, the fulcrum pin has been made to take its proper place for a given reading in the adjustment of the regulator 75 the portion 82 of the stud 74 is headed over or permanently fixed to the regulator 75. Small inaccuracies in the parts of the retarding mechanism (which are mostly stampings) may be compensated for in this way.

The gear train 64 terminates in an escapement device embodying an escapement or star wheel 83 and a pallet 84 cooperating therewith, the wheel being driven by a pinion 85 meshing with the last gear of the train. The pallet 84 is pivoted at 86 and comprises the usual yoke fitted with contact pins 87 while on the opposite side of the pivot it is weighed at 88 to give it a sluggish movement and thereby add retarding resistance to that supplied by the inertia of the gear train. Inasmuch as this escapement mechanism is operated while the master member is being wound as well as when the master member is operating effectively to open and close the blades it is desirable to reduce its resistance on the resetting movement in order that the latter may be accomplished as quickly and easily as possible. I provide for this in the present instance by shaping the teeth on the escapement wheel 83 so that they have one set of faces disposed at a greater angle to the radii than the other surface whereby the pallet 84 is driven by the wheel with greater mechanical advantage when it is itself being driven by the actuating mechanism during the setting movement thereof. This will appear from the showing of the wheel and pallet in Figures 4 and 6. Another way of saying the same thing is that the pallet offers less resistance to the wheel 83 when the latter is being driven by the setting movement of the master member.

I claim as my invention:

1. In a photographic shutter, the combination with a blade mechanism, an actuating mechanism therefor and a retarding device also driven by the actuating mechanism, of means for automatically locking the retarding device when the actuating mechanism is set and also when it is run down.

2. In a photographic shutter, the combination with a blade mechanism, an actuating mechanism therefor and a retarding device also driven by the actuating mechanism, of means for automatically locking the retarding device when the actuating mechanism is in set position.

3. In a photographic shutter, the combination with a blade mechanism and a retarding device, of actuating mechanism adapted to act upon both and adapted when moved in one direction to successively set and then lock the retarding device.

4. In a photographic shutter, the combination with a blade mechanism and a retarding device embodying a vibratory member having a re-entrant, arcuate locking face thereon, of actuating mechanism adapted to act upon both and embodying a rotatable master member provided with an actuating projection to engage and set the vibratory member and with a concentric arcuate locking face adapted to thereafter engage the locking face on the vibratory member and lock the retarding device in set position.

5. In a photographic shutter, the combination with a blade mechanism and a retarding device embodying a vibratory member having two re-entrant arcuate locking faces thereon, of actuating mechanism adapted to act upon both the blade mechanism and retarding device and embodying a rotatable master member provided with an actuating projection to engage the vibratory member intermediate its locking faces and to set the same and with two concentric arcuate locking faces on opposite sides of the actuating projection adapted to alternatively cooperate with the corresponding locking faces of the vibratory member and to lock the latter in normal and set positions respectively.

6. In a photographic shutter, the combination with a blade mechanism, an actuating mechanism therefor and a retarding device also driven by the actuating mechanism and embodying a vibratory member engaged by the actuating mechanism and a resistance adapted to receive motion from the vibratory member, of means for automatically locking the vibratory member in fixed relationship to the actuating mechanism when the latter is at rest, a regulator for adjusting various relationships between the vibratory member and the resistance, and means for locking the regulator.

7. In a photographic shutter, the combination with a blade mechanism and an interrupted gear for driving the same, of a master member having a winding spring and adapted to mesh with the gear when released and to pass the interrupted portion thereof when wound, a latch for locking the gear when out of mesh with the master member, and means on the latter adapted to directly engage the gear when the master member is wound to kick it into meshing position.

8. In a photographic shutter, the combination with a blade mechanism and an interrupted gear for driving the same, of a master member having a winding spring and adapted to mesh with the gear when released and to pass the interrupted portion thereof when wound, a yielding latch for locking the gear when out of mesh with the master member and a cam projection on the latter adapted to directly engage a tooth of the gear next adjacent to the interrupted portion thereof when the master member is wound to kick it into meshing position.

9. In a photographic shutter, the combination with a blade mechanism, a retarding device embodying two levers and actuating mechanism adapted to act upon both the blade mechanism and the levers of the retarding device through the medium of one of such levers, of a regulating element having an eccentric pivot pin thereon and a link turning on the said pivot pin and carrying pin constituting a shiftable fulcrum through which one of the two levers acts upon the other.

10. In a photographic shutter, the combination with a blade mechanism and actuating mechanism therefor having a setting in one direction in which it is free of the blade mechanism and an effective movement in the other direction in which it opens and closes the blades, of a retarding device driven by the actuating mechanism during both of its movements but in opposite directions and embodying an escapement wheel and pallet, the teeth on the wheel having one set of faces thereon disposed at a greater angle to the radii than the other set to drive the pallet with greater mechanical advantage when being driven by the actuating mechanism during the setting movement thereof.

WILLIAM A. RIDDELL.